G. KNOX.
AUTOMATIC EXPANSION VALVE.
APPLICATION FILED FEB. 4, 1910.
1,005,716.
Patented Oct. 10, 1911.
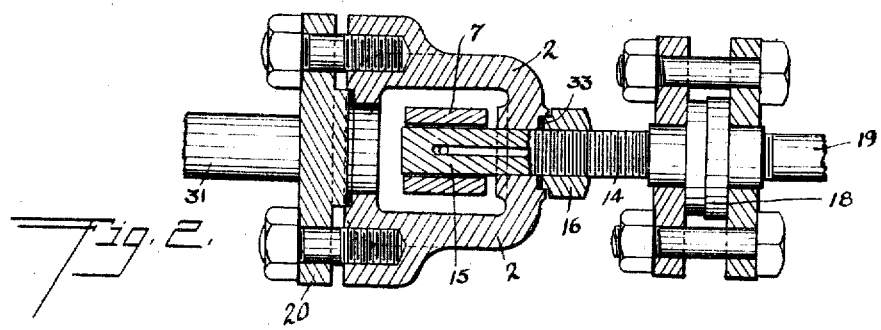
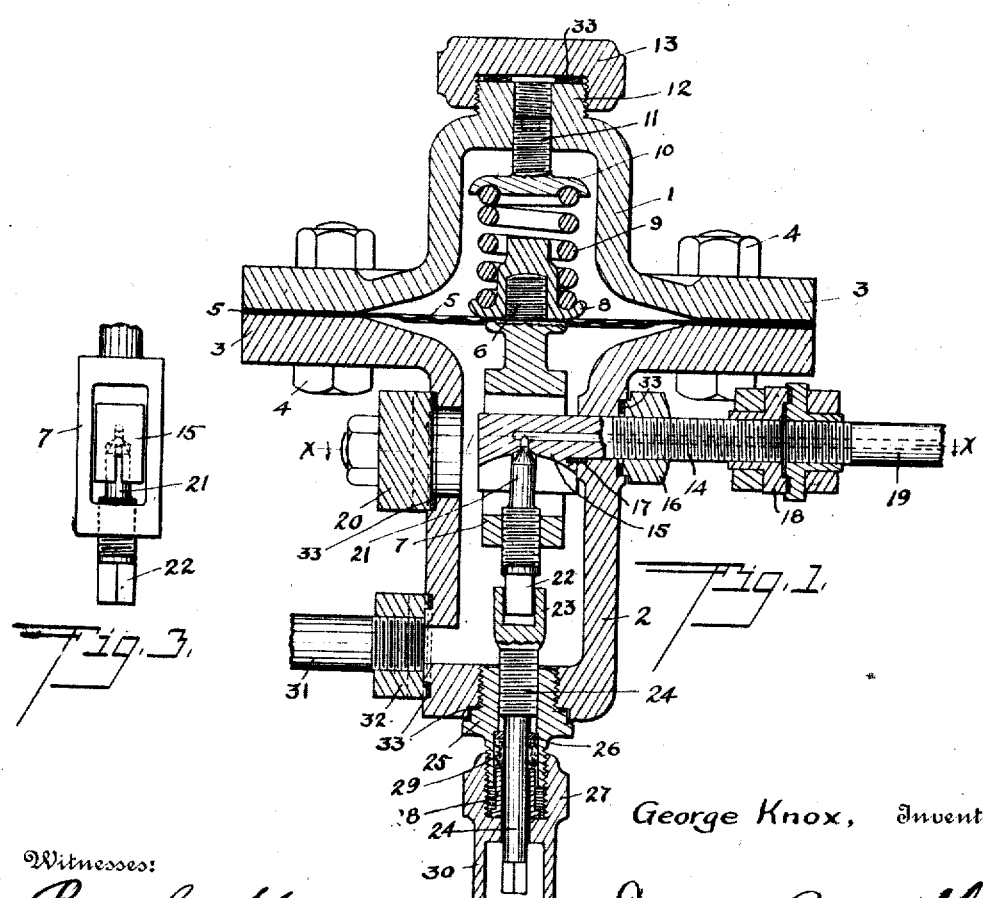
George Knox, Inventor.

UNITED STATES PATENT OFFICE.

GEORGE KNOX, OF OMAHA, NEBRASKA, ASSIGNOR OF ONE-HALF TO J. L. BAKER, OF OMAHA, NEBRASKA.

AUTOMATIC EXPANSION-VALVE.

1,005,716.  Specification of Letters Patent.  Patented Oct. 10, 1911.

Application filed February 4, 1910. Serial No. 542,080.

*To all whom it may concern:*

Be it known that I, GEORGE KNOX, a citizen of the United States, and a resident of Omaha, in the county of Douglas and State of Nebraska, have invented certain new and useful Improvements in Automatic Expansion-Valves, of which the following is a specification.

My invention relates to refrigerating machinery, and more particularly to automatic expansion valves or valves for automatically controlling the admission of a compressed volatile liquid, such as ammonia, into the portion of a refrigerating system in which such liquid is permitted to volatilize and expand.

It is the object of my invention to provide a simple and durable valve of this type, which may be regulated while in use to vary the expansion pressure necessary to cause the closing of the valve and the stopping of the supply of volatile liquid.

Constructions embodying my invention are illustrated in the accompanying drawings, in which—

Figure 1 is a vertical sectional view of the valve, Fig. 2 is a transverse horizontal section on the plane of the line *x—x* of Fig. 1, and Fig. 3 is a detail elevation of the inlet-pipe head and valve-stem supporting stirrup.

In carrying out my invention I provide a suitable casing consisting principally of two approximately bell-shaped bodies 1 and 2, having corresponding flanges 3 at the open ends thereof, through which flanges are passed bolts 4 to secure the bodies together. Between the flanges 3 are clamped the edges of a diaphragm 5 which separates the space inclosed by the casing into an upper and a lower chamber. The intermediate portion of the diaphragm is preferably corrugated, as shown, and through the center thereof is passed a threaded stem 6 having a flange at the base thereof and which is formed integrally with the stirrup 7 which extends downwardly therefrom into the chamber within the casing 2. The spring-cup 8 is screwed onto the stem 6 so that the diaphragm is clamped between them. In the chamber above the diaphragm and with the lower end thereof resting in said spring-cup 8 is a heavy coil spring 9, the upper end of which is engaged by a cup or seat 10 formed at the lower end of a threaded stem 11 which is screwed into a threaded opening extending through the upper end of the casing 1. The upper end of the stem 11 is provided with a rectangular recess, indicated by dotted lines in Fig. 1, adapting the same for engagement with a suitable key by which the stem may be turned from the outside of the casing and the compression of the spring 9 varied and adjusted. At the upper end of the casing 1 is a threaded nipple 12 over which is screwed a cap 13 by which the outer end of the threaded opening for the stem 11 is closed.

In one side of the lower casing 2 is an opening through which is passed a tubular stem 14 which at its inner end has a rectangular head 15 arranged to extend into the transverse opening in the stirrup 7. The outer portion of the stem 14 is threaded and is provided with a nut 16 by which the head is drawn into engagement with the inner wall of the casing, and a dowel 17 is provided in the abutting parts to prevent rotation of the stem. The outer end of the stem is provided with a suitable coupling 18 by which it is connected with the pipe 19 extending to the liquid-receiver of the refrigerating system. To permit assembling of the stem and casing, the latter has an opening therein opposite the opening for the stem and large enough to permit the head 15 to be passed through the same, the said opening being normally closed by the plate 20, as shown.

In the head 15 is formed a valve-seat adapted to be engaged by the conical end of a valve-stem 21 to close the opening from the stem 14 into the chamber within the casing. The head has a kerf made therein, as shown, intersecting the lower part of the conical seat to form a free vent for the liquid from the pipe 19 when the valve is open. The stem 21 has a threaded portion which is screwed through the lower part of the stirrup 7 so that the stem is carried by and is movable with the stirrup. Below said theaded portion is a squared portion 22 which extends loosely into a similarly formed recess or socket made in the head 23 of a stem 24 of which the portion adjoining the head is threaded and the lower portion of smaller diameter, unthreaded, and at its lower end squared to adapt the same for engagement with a suitable key or socket-wrench. The said stem

24 extends through a bushing 25 screwed in the lower end of the casing 2. The said bushing has an internally threaded portion engaging the threaded portion of the stem 24, and below said threaded portion is a stuffing-box of which the inner end is formed by a ring 26 disposed around the stem 24 and resting against a shoulder formed in the bore of the bushing adjoining the threaded portion thereof. The nut 27 which is used to press the gland 28 in upon the packing 29, is provided at its outer end with a shield 30 surrounding the lower squared end of the stem 24.

The pipe 31 from the expansion coils of the refrigerating system is connected with the lower part of the casing 2 by a suitable flange connection 32, as shown. Suitable gaskets 33 are provided for said flange connection, the bushing 25, plate 20, nut 10 and the cap 13, as indicated, to prevent leakage of the refrigerant from the casing.

When the valve is in use the position of the stem 21 relative to the stirrup may be adjusted by turning the stem 24, which stem forms, in effect, a prolongation of the valve-stem extending to the outside of the casing, the inner and outer portions of the stem having a longitudinally slidable connection whereby movement of the inner portion may occur while the outer portion remains stationary. When the pressure in the chamber formed within the casing 2 below the diaphragm is in excess of the amount for which the valve is set, the diaphragm is raised against the spring 9 so that the conical end of the stem 21 engages or approaches the valve seat in the head 15 and shuts off or reduces the supply of liquid from the pipe 19. Similarly, when the pressure falls below the desired amount the valve is automatically opened by the downward movement of the diaphragm permitted when the pressure in the lower chamber is reduced. The strength of the spring 9 is made such that a very slight compression thereof, together with the resilience of the diaphragm, will be sufficient to counterbalance the normal pressure desired upon the lower surface of the diaphragm, and adjustment of the compression of the spring 9 seldom need be made.

Now, having described my invention, what I claim and desire to secure by Letters Patent is:

In an automatic expansion valve, a casing, a diaphrogm aranged therein to divide the space therein into an upper and a lower chamber, a spring arranged in the upper chamber to oppose pressure upon the diaphragm from the lower chamber, means for adjusting the compression of the spring from the outside of the casing, the part of the casing inclosing the lower chamber having opposite openings therein, an inlet pipe having a threaded stem passed through one of said openings and a head larger than said opening but passable through the other opening, a nut disposed on the external part of the threaded stem for drawing the head against the inner wall of the casing, means for closing and opening opposite said head, a valve seat formed in the head, a valve engageable with said valve seat to close the inlet from the pipe a threaded stem integral with said valve, a member depending from the diaphragm and carrying said threaded valve stem, and a stem slidably and non-rotatably engaging said valve stem and extending through the casing to the outside thereof.

In testimony whereof I have hereunto subscribed my name in the presence of two witnesses.

GEORGE KNOX.

Witnesses:
 Roy G. Krat,
 D. O. Barnell.